United States Patent [19]

Cheung

[11] 4,396,947
[45] Aug. 2, 1983

[54] APPARATUS FOR ENCODING OF INFORMATION

[75] Inventor: William S. H. Cheung, Hong Kong, Hong Kong

[73] Assignee: Payview Limited, Kowloon, Hong Kong

[21] Appl. No.: 134,185

[22] Filed: Mar. 26, 1980

Related U.S. Application Data

[63] Continuation-in-part of Ser. No. 91,784, Nov. 6, 1979, abandoned.

[30] Foreign Application Priority Data

Feb. 20, 1979 [GB] United Kingdom ............... 7905858

[51] Int. Cl.³ .................... H04N 7/16; H04K 1/04
[52] U.S. Cl. ........................... 358/124; 358/123; 358/120
[58] Field of Search .................. 358/120, 123, 124

[56] References Cited

U.S. PATENT DOCUMENTS

| | | | |
|---|---|---|---|
| 2,857,455 | 10/1958 | Jolliffe | 358/123 |
| 2,916,543 | 12/1959 | Druz | 358/123 |
| 3,081,376 | 3/1963 | Loughlin et al. | 358/120 |
| 3,478,166 | 11/1969 | Reiter et al. | 358/120 |
| 3,538,243 | 11/1970 | Shanahan et al. | . |
| 3,696,297 | 10/1972 | Otero | . |
| 3,886,302 | 5/1975 | Kosco | . |
| 3,919,462 | 11/1975 | Hartung et al. | 358/124 |
| 3,968,327 | 7/1976 | Gregg | . |
| 4,008,369 | 2/1977 | Theurer et al. | . |
| 4,045,814 | 8/1977 | Hartung et al. | 358/124 |
| 4,058,830 | 11/1977 | Guinet et al. | . |
| 4,081,832 | 3/1978 | Sherman | 358/124 |
| 4,116,662 | 9/1978 | Revells | . |
| 4,215,366 | 7/1980 | Davidson | . |
| 4,222,068 | 9/1980 | Thompson | 358/124 |
| 4,307,416 | 12/1981 | Spano | 358/124 |

*Primary Examiner*—S. C. Buczinski
*Attorney, Agent, or Firm*—Pollock, Vande Sande & Priddy

[57] ABSTRACT

A composite video signal containing an information portion and a synchronization pulse is encoded by shifting the level of the synchronization pulse and also by inverting the information portion. The encoding is switched on and off at a randomly chosen frequency, under the control of random number generator enabled at regular intervals. The encoded signal is transmitted with a data signal representing the random number so that a receiver can decode the received signal. The transmitted data can include details of undesired recipients, to disable their decoders. Applied to a pay TV system, the transmitted data can include the rate to be charged for the program and a billing mechanism at the receiver will meter the appropriate charge.

19 Claims, 9 Drawing Figures

APPARATUS FOR ENCODING OF INFORMATION

This is a continuation-in-part of Ser. No. 091,784, filed Nov. 6, 1979 now abandoned.

BACKGROUND OF THE INVENTION

This invention relates to encoding a television signal, and it is also concerned with the transmission of such an encoded signal, and the reception and decoding of such a signal.

Coding of information is required when it is desired to restrict the reception of the information in intelligible form to certain recipients, for example the subscribers to a television service.

I have described in my earlier co-pending application Ser. No. 930,496, a coding arrangement in which the information-bearing portions of alternate groups of lines are inverted. The number of lines in a group (which number may be one) is randomly selected for each field. The accompanying audio information is coded by conversion of the audio signal to digital form. The present invention is an improvement of my earlier coding system.

Encoding apparatus for television signals in which the information-bearing portions of some lines are inverted are shown in U.S. Pat. Nos. 3,801,732, 3,919,462, 4,022,972 and 4,025,948.

SUMMARY OF THE INVENTION

According to one aspect of the invention there is provided encoding apparatus for encoding a composite signal including an information portion and a synchronization pulse, the apparatus comprising a random signal generator and means for varying the level of the synchronization pulse in response to said random signal. In varying the level of the pulse, the maximum and minimum potentials are both changed. Further encoding may be achieved, as described in my earlier co-pending application, hereby incorporated by reference, by providing means for encoding the information portion, said means comprising means for inverting the signal during successive information portions for alternate periods whose length depends on said random signal. Alternately, rather than randomly varying the width of the inverted portion of the video signal, it is possible to provide during each field of video signal a sequence of video lines which alternate with inverted video lines. The beginning line for each sequence is randomly controlled so that the sequence begins at a different line during each field.

The invention may also include transmitting apparatus for transmitting the composite signal encoded as described above, and the invention may also include receiving apparatus for receiving the transmitted signal and decoding the received signal to provide a composite signal restored to its original form.

An example of the invention will now be described with reference to the accompanying drawings.

DETAILED DESCRIPTION OF THE INVENTION

Figure 3:
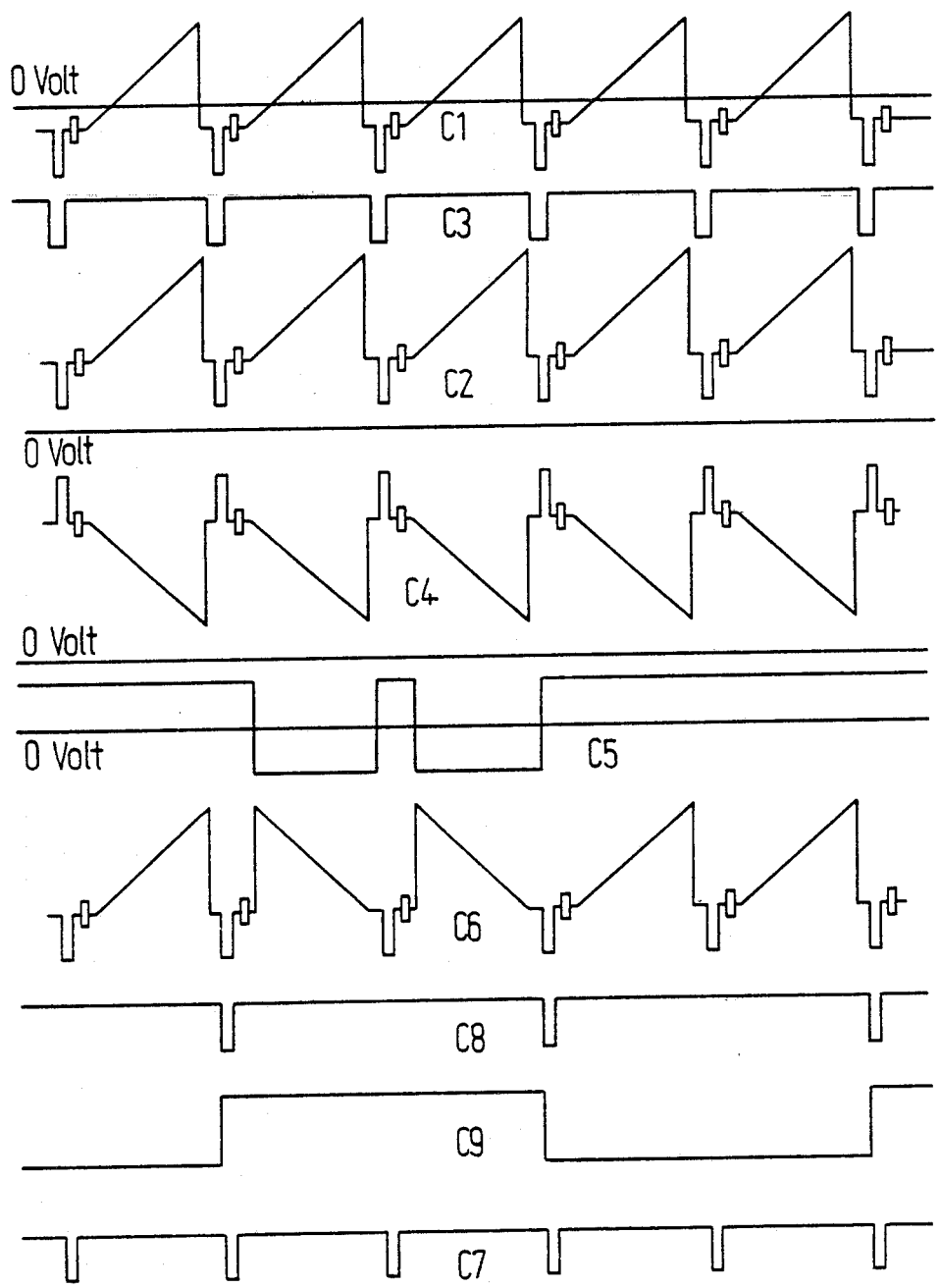
FIGS. 3 and 4 represent waveforms appearing respectively in the apparatus of FIGS. 1 and 2.

As shown in FIG. 3, waveform C1 shows five line periods of a composite video signal. Each line period comprises an initial nagative-going DC line synchronization pulse, a short synchronizing burst of high frequency signals and a period of positive going amplitude modulated carrier wave signals representing the video information in the line. The signals representing the video information are shown to have a saw-tooth envelope, but in practice will have an irregular envelope. The composite waveform is related to ground potential in that the negative extreme potential of the line-sync pulse and the maximum possible potential of the video signal are equal and opposite.

For the encoding process to be described it is convenient if the whole composite video signal is of single polarity. The signal is therefore applied to a distribution amplifier 11 (FIG. 1) and a signal from a DC level inserter circuit 51 is applied on line 52 to the amplifier 11 to shift the whole composite signal to positive polarity, as shown at waveform C2.

The amplifier 11 has a second output at which the unshifted amplified composite video signal appears and which is connected through a low pass filter 12 to a synchronization separator circuit 13. This circuit 13 produces an output to a line synchronization separator 14 which separates out the initial negative-going DC pulse of the composite signal, and an output to a field integrator 15 which produces a signal representing field synchronization pulses of the vertical blanking period at the beginning of a field. Since the line and field pulses produced do not occur right at the beginning of the lines and fields respectively, delay circuits 16, 17 are included after respective circuits 14 and 15 producing an output exactly at the start of the next line and field, the delays being slightly less than one line and one field period respectively. The output of the circuit 16 is shown at waveform C3. Each pulse occurs accurately at the beginning of a line, whereas the input signal derived from the line synchronization pulses of waveforms C1 and C2 are slightly delayed at the beginning of the line. Connected to the line delay circuit 16 is a line chop pulse generator 18 which responds to the output pulse at the start of the line and produces a chop pulse during the video period of the composite line signal which is applied to one input of an AND gate 21. The chop pulse does not occur during the time sync or sync burst periods. Similarly, a vertical chop pulse generator 19 responds to the output of the field delay circuit 17 at the start of a field to produce a signal starting at the end of each field period and this signal is applied to the other input of the AND gate 21. The AND gate 21 will therefore produce a signal except during the horizontal and field synchronization periods, i.e. the signal is produced during the period available for video information in every line.

Pulses at field frequency produced by the field integrator 15 are applied to a random number generator 22. On the receipt of an input pulse, the number generator 22 generates a random binary number on parallel output lines which are connected firstly to a divide-by-N counter 23 (which can be a logic unit SN 74193) and secondly to a parallel to serial converter 24 which converts the signals on the parallel lines into a train of pulses representing the random number generated and the train of pulses is applied to a data processor 25 to be discussed below. The divide-by-N counter 23 is fed with signals occurring at line frequency (waveform C7) from the line synchronization separator 14 and is a special form of shift register. The counter is arranged to respond to only the Nth pulse received on its data input line 26 and to forward the counted pulses (waveform C8) to a flip-flop 29 whose output (waveform C9) energizes an input of AND gate 31 between alternate sets of N line pulses. The value of N is the random number generated for each field. The output of the vertical chop pulse generator 19 also operates a data inhibit gate 32 whose output continues after the vertical chop pulse for the period of the first few lines of the field which are to be used for transmitting data. The output of gate 32 is connected to the other input of the AND gate 31 so that the AND gate only produces an output alternating every N lines other than during the vertical blanking and data periods. The output of the AND gate 21 is connected to the input of AND gate 33. The AND gate 33 is therefore enabled during alternate N line pulse periods except during the horizontal and the vertical blanking periods. The output of AND gate 33 causes complementary actuation of two analog transmission gates 35 and 36, the connection to gate 36 being through an inverter 58.

Figure 4:
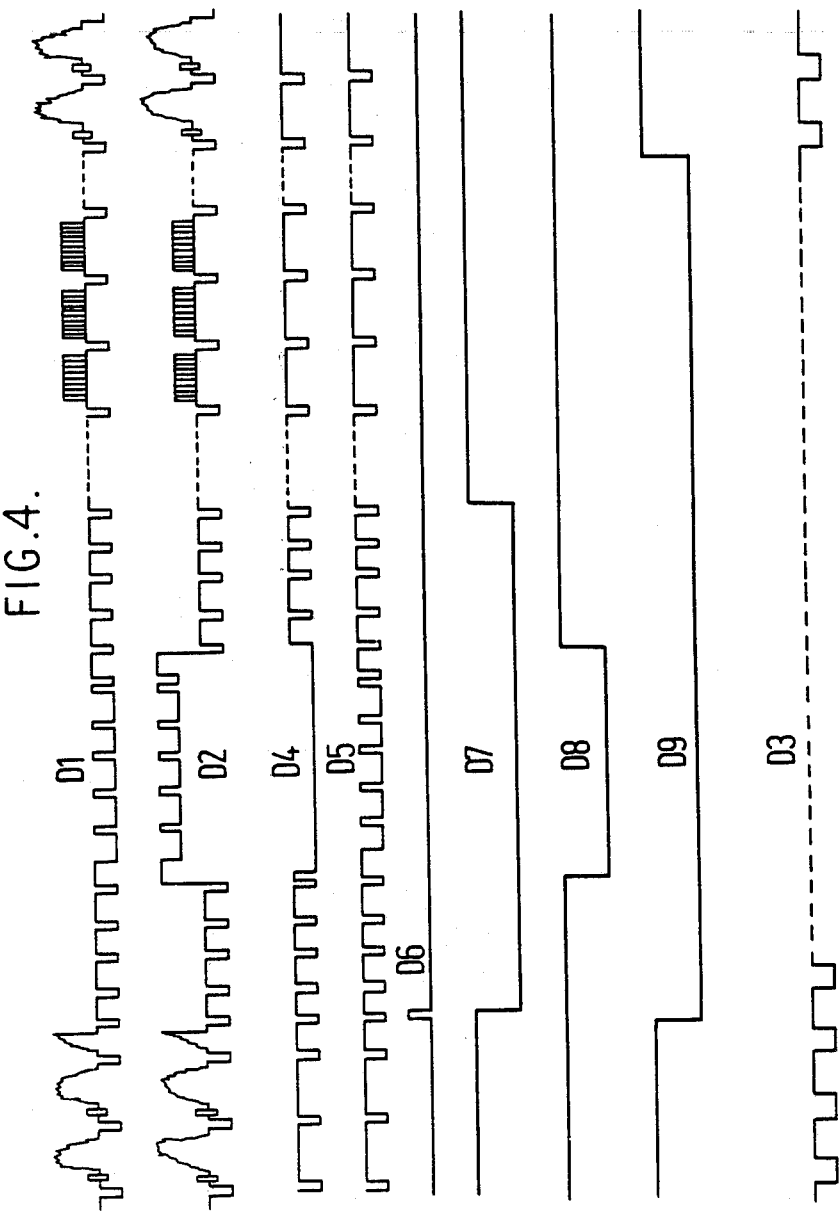

AND gate 34 has one input connected to the field integrator 15 and the other input connected to a line from the random number generator 22 to the converter 24. This line is also connected through a programmable counter 59 to an audio coding unit 61 as described in my co-pending application Ser. No. 91,781. The gate 34 thus produces an output at certain of the vertical synchronization periods according to the presence or absence of a digit in the random number generated and this output is applied to the vertical synchronization scrambler 53 to shift the level of certain vertical synchronization periods according to a digit of random number generated for that field. When the sync pulses in the transmitted signal are shifted, a receiver cannot respond to them and will be unable to synchronize the frame. When the pulses are not shifted, a receiver will synchronize itself as usual. Waveform D1 (FIG. 4) shows the vertical blanking period including the fly back period of five negative going pulses, the vertical synchronizing period of five positive going pulses an an equalization period of five negative going pulses. Waveform D2 shows the vertical synchronization period shifted by a positive voltage by AND gate 34.

The outputs of the line synchronization separator 14 and of the field integrator 15 are also applied to a synchronization processor 62 connected to a clock pulse generator 63. The clock pulse generator output is also applied to the converter 24 and the data processor 25. The processor 62 shapes the line and field synchronization signals with the assistance of the clock pulses and feeds the shaped signals to the converter 24 and a line selector and coding starter 37. The starter 37 is fed with the output of a zero time reference generator 38 activated by the output of field integrator 15 to signify the beginning of a field, and provides an output to a data insertion unit 56 during selected lines of a field during which lines data (as distinct from video) fed with two channels of coded audio information by a coder 61 fed from the converter controlled by the random number generator 22 as described in my aforementioned co-pending application Ser. No. 91,781. The data information is assembled in the parallel to serial converter 24 in the form of a train of binary signals representing in turn the random number generated by 22, the subscriber's identity data (e.g. the state of his account) and the billing date (e.g. the rate at which the program is to be charged). The processor 25 converts the binary signals into biphase signals and feeds them to the data insertion unit 56. The starter 37 also resets the counter 23 at the end of each field to be ready for a new value of N generated by 22 for the next field.

The composite video signal amplified by the distribution amplifier 11 and shifted in level by the circuit 51 passes to the vertical synchronization scrambling circuit 53 which is enabled in response to the output of AND gate 34 to shift the DC level of the vertical synchronization signal in a random manner depending on the random number generated. The output of the shifting circuit 53 is supplied to a phase splitter 54 which provides two signals of equal and opposite polarity which are fed through complementary analog transmission gates 35 and 36 whose outputs are combined in an adding circuit 55 and connected through the data insertion circuit 56 to a modulator 57. The analog transmission gates 35 and 36 are enabled alternately by signals connected respectively directly to the output of AND gate 33 and through inverter 58 to the output of AND gate 33. Thus during the video periods of certain lines as selected by the random generator 22, the polarity of the transmitted signal will be reversed. The horizontal synchronization pulses are unaffected since the line chop pulse generated by 18 only starts at the beginning of the video period. The outputs from the gates 35 and 36 combined in the adding circuit 55 are combined with the output of the data processor 25 during the times selected by the starter 37 in the data insertion circuit 56 which is then used to modulate a carrier signal in the modulator 57. The modulator 57 is also fed with two channels of coded audio information by a coder 61 fed from the converter controlled by the random number generator 22 as described in my co-pending application SN091781 filed November 6, 1979, hereby incorporated by reference.

Waveform C2 shows five line periods of the composite video signal, non-inverted, as applied to gate 35. Waveform C4 shows the same five line periods inverted as applied to gate 36. Waveform C5 shows the switching pulses applied to gate 35, causing gate 35 to transmit the first, fourth and fifth lines completely and the line synchronizing periods of the second and third lines. During the negative going periods of the switching pulses, gate 36 is enabled by inverter 58, so that the inverted video signal is transmitted for the second and third lines. The signal combined by adder 55 is shown at waveform C6.

The composite video signal is thus encoded in two ways. The vertical synchronization DC level is shifted in random manner by the circuit 53, and certain groups of lines of video information are reversed in polarity according to the random number generated by 22 for each field. A receiver which was not fitted with a matching decoder would produce a picture which "rolled" since the vertical hold circuits in such a receiver could not use the shifted vertical synchronization pulses to synchronize the field of the receiver picture. Furthermore, alternate groups of lines would appear distorted due to the inversion of the video signal and the width of these groups would change in each field so that no part of the picture would be likely to remain undistorted long enough to be enjoyed by the viewer. The random number is generated anew for each field so that the change in the line group pattern occurs generally at 50 or 60 hertz.

Figure 2:
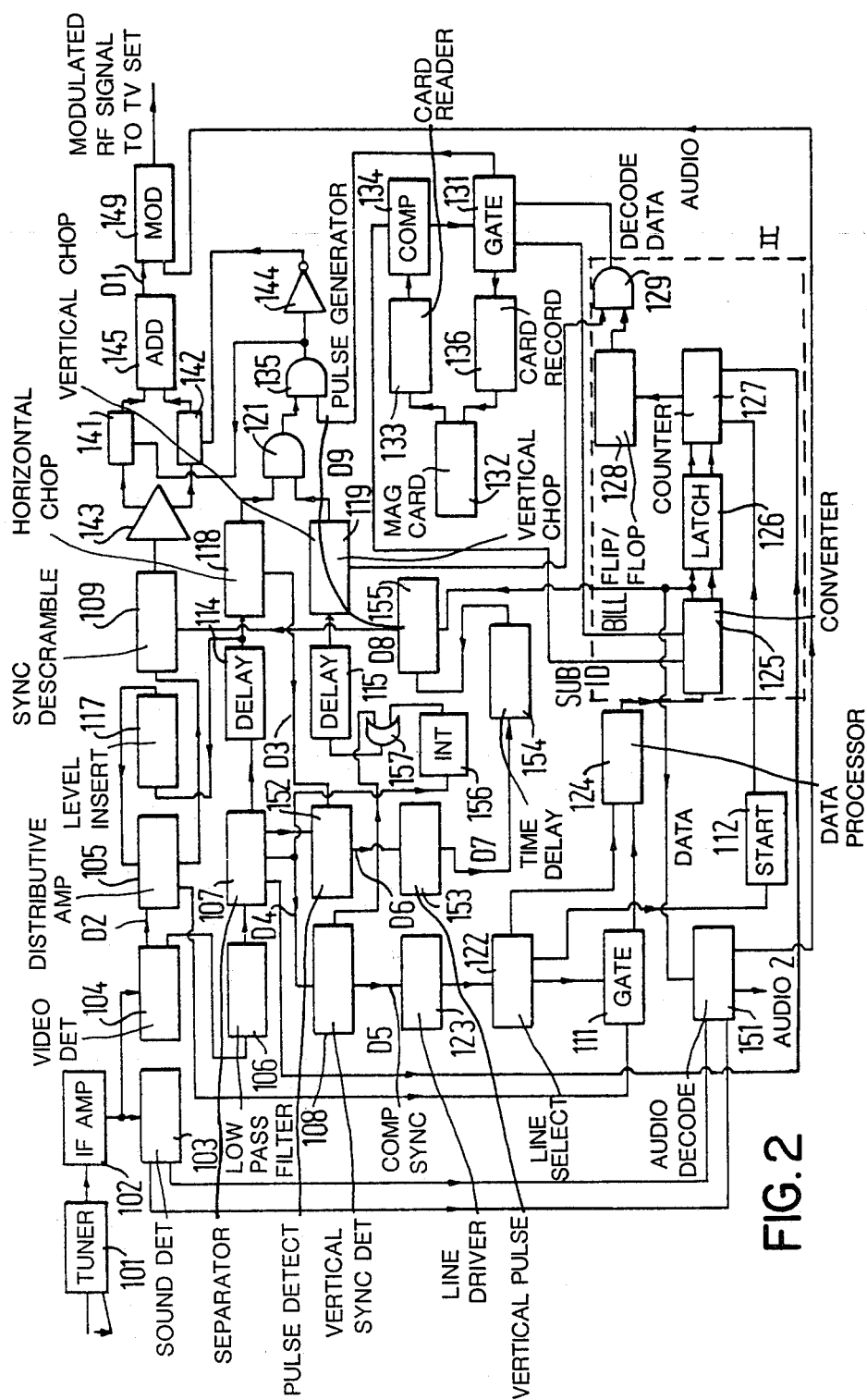
FIG. 2 is a block diagram of a receiver for use with the apparatus of FIG. 1.

The modulator 57 feeds a transmitter not shown, and the coded signals are received in a receiver as shown in FIG. 2.

Figure 1:
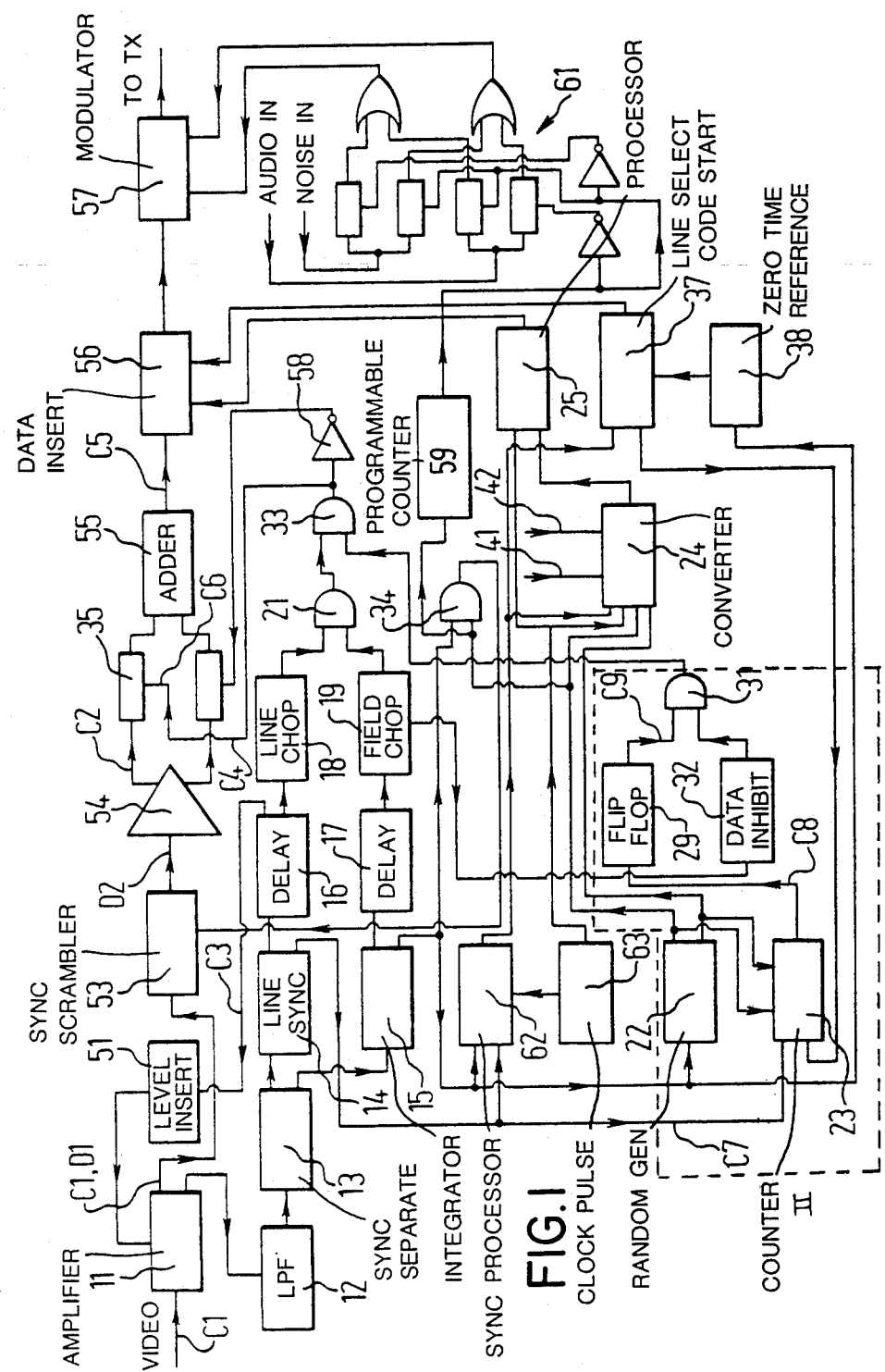
FIG. 1 is a block diagram of an encoder for use with a transmitter of a composite video signal.
Figure 5:
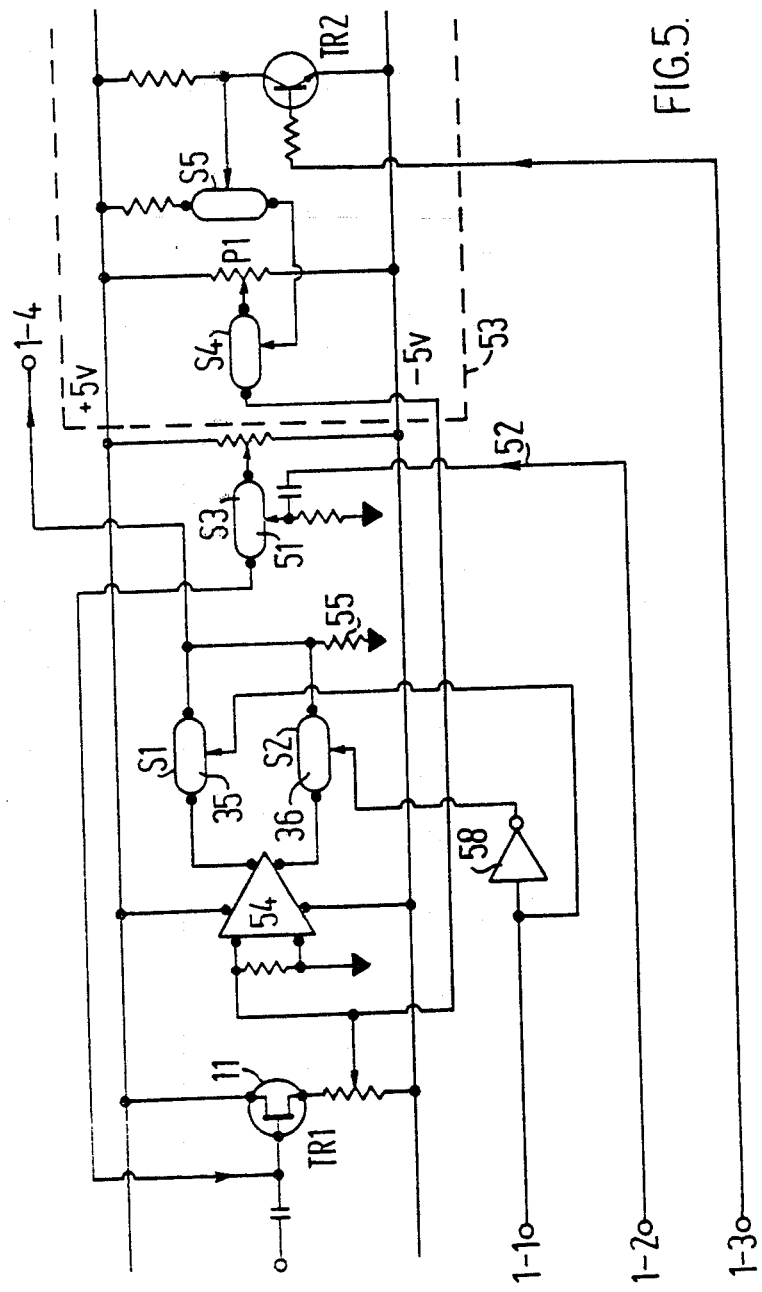
FIG. 5 is a detail of the apparatus of FIG. 1.

FIG. 5 shows some components of FIG. 1 in greater detail. The distribution amplifier 11 comprises a field effect transistor TR1 to whose gate the composite video input is applied. An additional DC level is added to the applied composite video input from swich S3 under the control of a signal from the line sync separator 14 on line 52. The amplified signal appears across a load resistor of TR1.

The output of gate 34 is applied to the base transistor TR2 in the scrambler 53 which also comprises two switches S4 and S5. When a signal is received from gate 34, S4 and S5 close and add the positive potential pulse from 34 to the input of the phase splitter 54 (an operational amplifier) in order to effect the DC common mode balance in the vertical sync pulse period. The vertical scrambled composite video signal is passed through the phase splitter 54 to the switches S1 and S2 forming gates 35, 36 respectively. The outputs of the switches S1 and S2 are added by the grounded resistor forming the adder 55 and passes to the data insertion circuit 56. The received signal is fed through a tuner 101, intermediate frequency amplifier 102 to separate sound and video signal detectors 103 and 104. The decoding of the sound signals is described in my co-pending application Ser. No. 091,781 filed Nov. 6, 1979. The detected video signal is applied from 104 to a distribution amplifier 105 and also to a low pass filter 106 and a synchronization separator circuit 107 whose output is shown at waveform D1. A delay circuit 114 applies a delay of almost one line period to the output of the separator 107, in a similar manner to the circuit 16 of FIG. 1, and a horizontal chop pulse generator is connected to the circuit 114 to generate horizontal chop pulses (waveform D3) to cover the whole line period except for the video information period. The output of the circuit 114 is applied through a DC level inserter circuit 117 to adjust the level of the received composite video signal to compensate for the shift of potential applied by circuit 51. The adjusted signal is applied through a vertical sync unscrambler 109 to a phase splitter 143.

Since the encoded signal had certain vertical synchronization periods shifted in DC level (see waveform D2), the output of the synchronization separator circuit 107 will occasionally be blank since it will not respond to shifted pulses (see waveform D4), and a missing vertical synchronization pulse detector 108 is used to detect these blank periods and to reconstitute the vertical synchronizing pulses missed (see waveform D5). The reconstituted vertical sync pulses are fed through a line drive generator 123 to a preset line selector 122 which selects the same lines after the beginning of the field as those selected by 37 in the encoder for response to data signals, by enabling a data gate 111 which connects the output of the distribution amplifier 105 to a data processor 124 which converts the biphase data in the composite video signal to ordinary binary signals. The data lines of the signal have not been inverted, since gate 32 inhibits gates 31 and 33 during the selected data period. The data processor 124 feeds a serial to parallel converter 125 which produces decoding data, billing data and subscriber identity data. The decoding data represents the random number in parallel form corresponding to the output of the convertor 24 in the encoder, and this is latched in a latch 126 and caused to operate a divided-by-N counter 127 which is also fed with the output of the synchronization separator 107 to synchronize its counting with the lines of the picture. The selector 122 enables a programmed decoding starter circuit 112 to enable the counter 127 after completion of the data period, thus producing an output every N lines, which output is fed to a flip-flop 128 which enables an AND gate 12 for alternate periods of N lines. The other input of the AND gate 129 is fed from a vertical chop pulse generator 119 described below, and the output of the AND gate 129 passes to an input of an AND gate 135 through a gate 131, the other input of the AND gate 135 being supplied by the output of the AND gate 121.

An equalization pulse detector 152 is fed with the output (waveform D1) of the sync separator 107 and with the output (waveform D3) of the horizontal chop pulse generator 118. During the vertical blanking period, there will be some sync pulses not chopped out by the chop pulses, and these (waveform D6) are applied to a wide vertical pulse generator 153 the leading edge of whose output (waveform D7) is delayed in a time delay 154 (to allow for the fly back period) to generate in generator 155 a vertical sync shift pulse (waveform D8) to correct the level of the vertical sync signals in the composite video signal in the unscrambler 109. This shift of the sync signals is only required when the received signal contains shifted vertical sync signals and the generator 155 is disabled by a signal representing the random number from the converter 125 when the shift pulse of waveform D8 is unnecessary. The regenerator 153, the time delay 154 and the pulse generator 155 may all comprise monostable vibrators.

When the vertical sync signals are missing from the output of the sync separator 107, their absence will be sensed by the detector 108 and regenerated by that circuit. When they are present (i.e. when the scrambler 53 was not actuated), they are integrated in an integrator 156. An OR gate 157 is connected to the outputs of the regenerator 108 and the integrator 156 so that its output will always represent the vertical sync pulses, which are then applied through a delay circuit 115 giving a delay of almost one field (corresponding to the circuit 17 of FIG. 1) to a vertical chop pulse generator 119.

The outputs of the generators 118 and 119 (waveform D3 and D9 respectively) are applied through an AND gate 121 to the other input of AND gate 135.

Each subscriber has a magnetic card 132 which is placed in a card reader 133 and the reader output is compared in a card data comparator 134 with the subscriber identity data from the converter 125. Provided that the identity of the subscriber on his card does not match the list of unacceptable subscribers received from the transmitter, the gate 131 is enabled to pass the decoding data to the first input of gate 135, and the gate 131 also passes the billing data from the converter 125 to a card recorder 136 which acts on the magnetic card 132 to record on the card the charge to be made for the program being watched. At intervals, the card 132 is processed to establish the charge to be paid by the subscriber for the reception service.

The output of the AND gate 135 operates complementary gates 141 and 142 supplied by the phase splitter 143 which receives the output of vertical sync unscrambler. The gate 141 is fed directly from the output of the AND gate 135, and the gate 142 through an inverter 144 from the output of the AND gate 135, so that the gates 141 and 142 are enabled alternately. The adder 145 which receives the outputs of gates 141 and 142 has both the video information restored to its original polarity and level and the vertical synchronization signals restored to their original level, and this is fed to a modulator 149 in which the standard carrier signal is modulated with the decoded video signal from 145 and also with decoded audio signals from the audio decoding circuit indicated generally at 151 supplied with decoding data from the convertor 125 and coded audio signals on two channels from the sound detector 103 in a manner as described in my copending application Ser. No. 091,781. The output of the modulator 149 is then applied to the standard television receiving set antenna input. The decoder 151 produces an audio output on a second channel which is used as desired.

Figure 6:
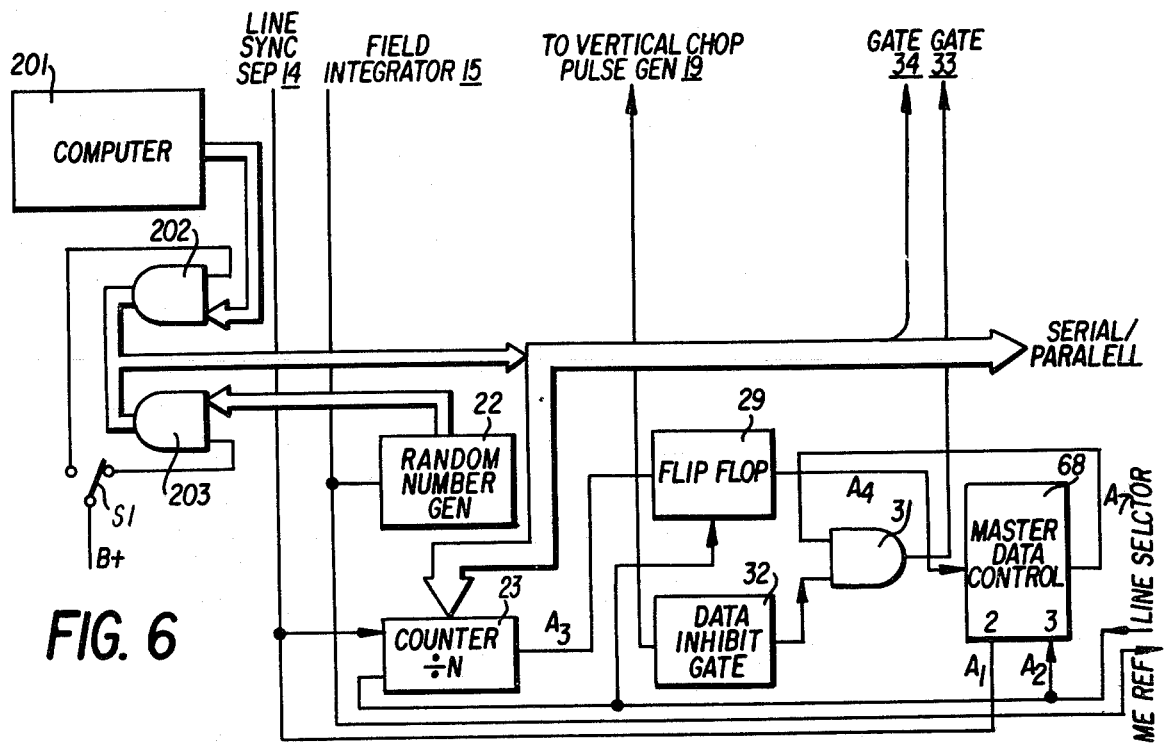
FIG. 6 illustrates circuitry of yet another embodiment wherein alternate lines of a portion of each field are encoded.

In still another embodiment of the invention, encoding of the video signal may be accomplished in accordance with the apparatus shown in FIG. 6.

FIG. 6 includes circuitry previously shown in FIG. 1 and illustrates control circuitry for determining when lines of video signal in a given field are to be inverted. The circuitry of FIG. 6 replaces the circuitry II of FIG. 1.

Referring now to FIG. 6, there is shown a computer 201 which may be any digital device for generating a serial binary word, the word being used to preset the counter 23. Switch S1 selects either the computer 201 or the random number generator 22 for providing a divisor to counter 23. Suitable gates 202 and 203 permit the steering of data from either the random number generator 22 or the computer into the devisor input of counter 23.

Thus, the transmitter may make use of a predetermined serial code by use of the computer 201, or may use a random number generated during each vertical field as a divisor for the counter 23. Gate 31 in FIG. 1 is enabled by a signal from flip-flop 29 and the data inhibit gate 32. The embodiment shown in FIG. 6 changes this somewhat so that enablement of the gate 31 is under control by a master data control unit 68. Master control 68 will enable gate 31 in response to an input from flip-flop 29 indicating that the counter has reached the predetermined count. At that time, master control unit 68 will alternately enable gate 31 which alternately enables gate 33, thereby providing during each field of video signal alternate lines of video which are "inverted". By inverted, it is understood that the luminance level and chrominance phase angle indicated by the video signal is shifted such that a television receiver demodulating video signal displays a line having an incorrect brightness level and color. At the conclusion of a field marked by the presence of a vertical synchronization pulse, the counter 23, master control 68, flip-flop 29, are reset until the next field represented by the video signal begins. At this time the counter 23 commences counting again and the sequence is repeated whereby the counter output will enable the master data control unit 68 through flip-flop 29 after a predetermined number of lines have been counted to provide an alternate sequence of inverted video lines.

Figure 7:
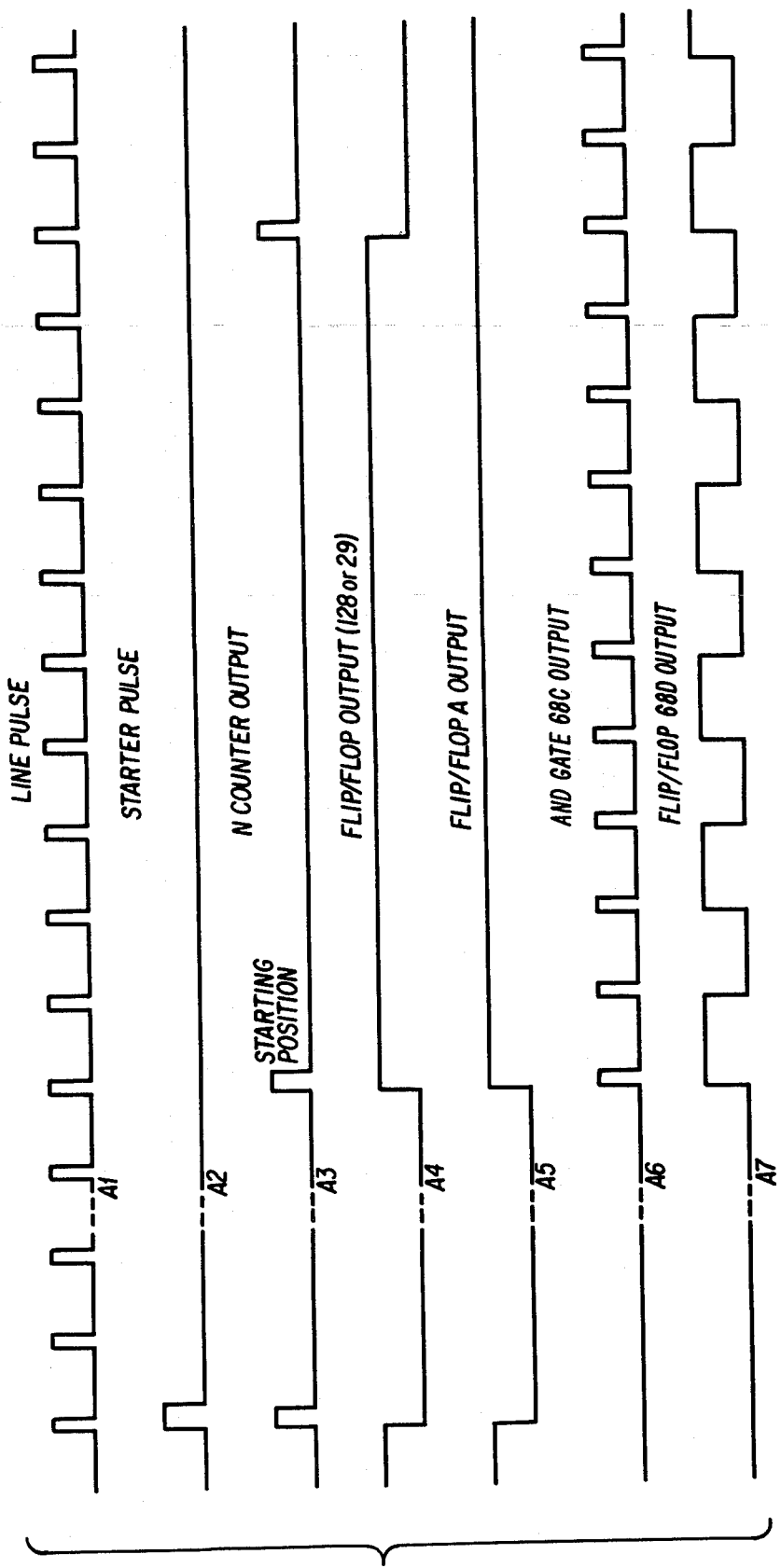
FIG. 7 illustrates waveforms appearing in the apparatus of FIG. 6 and FIG. 9.

The operation of FIG. 6 in more detailed explanation is as follows. When data is supplied by the steering gates 202 and 203, the counter 23 is set with either a random number for a divisor or the number provided by the computer 201. Clocking of the counter 23 is achieved by line synchronization pulses from the line sync separator 14. When the desired count has been achieved, video scrambling commences. In FIG. 7, appropriate timing diagrams illustrate the starting position pulse provided by the counter output A3 with respect to the line pulses received from the sync separator 14. Flip-flop 29 is thereafter set which enables the master data control unit 68.

Figure 8:
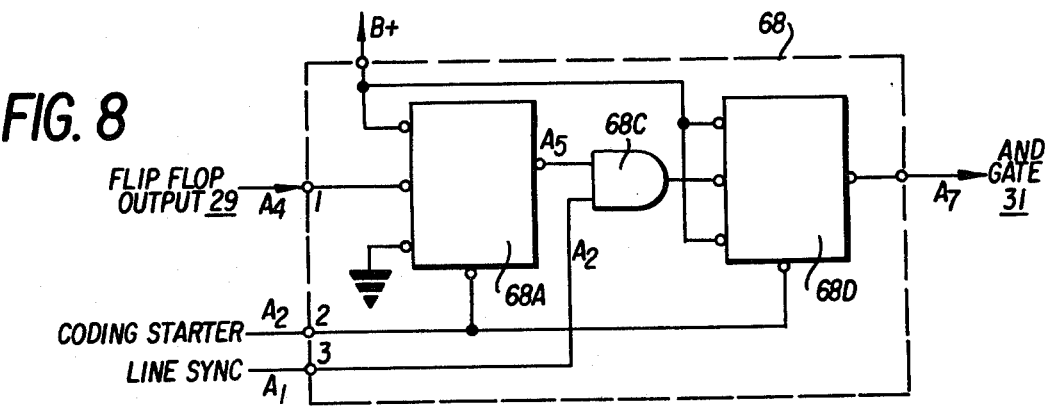
FIG. 8 illustrates specific circuitry of a master control logic circuit in FIG. 6 and FIG. 9.

Referring now to FIGS. 7 and 8, there is shown more specifically a master control unit 68. The flip-flop 68A within the master control unit is toggled by the flip-flop 29 to enable AND gate 68C. AND gate 68C thereby communicates a toggling signal to a second flip-flop 68D within the master control unit 68 which is clocked by line synchronization pulses A2. The output of the flip-flop 68D is returned to AND gate 31 whereby, as shown in FIG. 7, it is alternately enabled upon receipt of succeeding line synchronization pulses. Therefore, gate 33 which controls the inversion of the video signal lines is alternately enabled, thereby providing a sequence of video lines which are alternately inverted.

Thus, there has been described with respect to FIG. 6 an apparatus which will permit changing the level of the vertical synchronization pulse as well as providing for inversion of video signals over a portion of a given field of a picture being transmitted. The apparatus of FIG. 6 shifts the vertical synchronization pulses as was done in the embodiments of FIG. 1. The vertical synchronization pulse therefore is shifted when there is coincidence at gate 34 which occurs under control of either the random number generator 22 or the computer 201.

At the conclusion of a field being transmitted, the line selector coding starter circuit 37 provides, as was done in the previous embodiments, a reset signal to both the master data control unit 68 and the counter 23. The master data control signal resets the two flip-flops 68A, 68D associated therewith and the counter 23 begins to count upon receipt of the next line of video signal representing the successive field to be scrambled. As is true in the previous embodiment of FIG. 1, gate 33 is only enabled when video information is being transmitted, and is disabled during the horizontal and vertical blanking of the signals. Data processor 25 and parallel-to-serial converter 24, as in the previous embodiment, transmit in the format of a biphase modulated code the number which has been set for the divisor in counter 23. Thus, it can be seen that the embodiment of FIG. 6 permits for scrambling of the signal under control of the random number generator 22 or of the computer 201. The starting point of the scrambling during each field of video information is altered in accordance with the signal produced by the computer 101 or random number generator 22.

Figure 9:
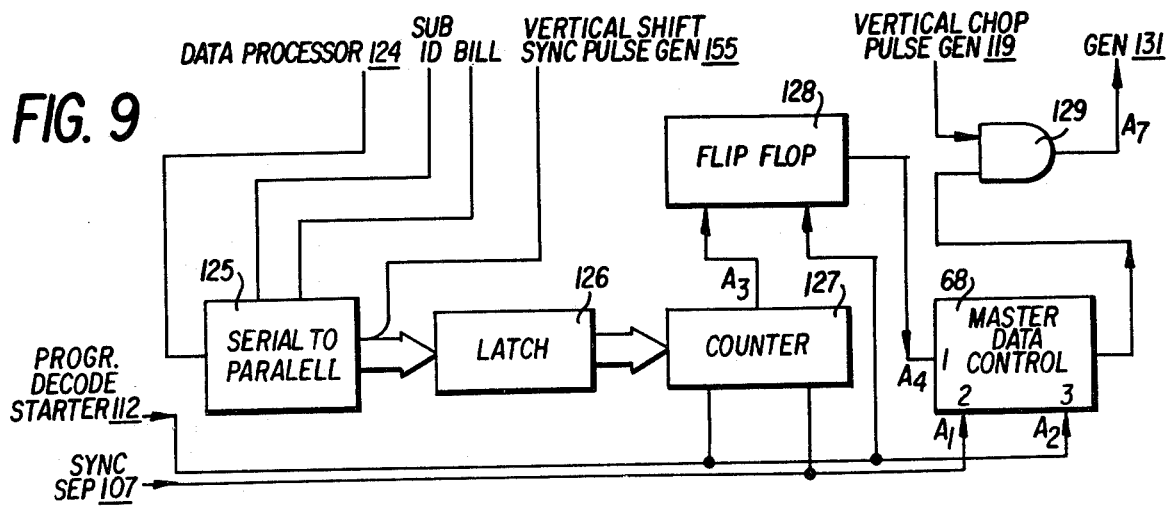
FIG. 9 illustrates circuitry for decoding the signal produced by FIG. 6.

Modifications to the receiver of FIG. 2 useful for receiving and decoding the transmitted data provided by the embodiment of FIG. 6 is shown more particularly in FIG. 9. FIG. 9 includes a master data cntrol unit 68 not shown in the embodiment of FIG. 2. In other respects, the subject matter of FIG. 9 is identical to FIG. 2.

The master data control unit 68 of FIG. 9 is identical to the unit 68 shown in FIG. 8. When counter 127 provides an output to flip-flop 128, the master data control unit 68 is enabled by toggling a first flip-flop 68A contained therein. AND gate 68C contained within the master control unit 68 is enabled during each line sync pulse, and when the first flip-flop 68A is in the set condition, the second flip-flop 68D is toggled when each line sync pulse is received, thereby corresponding with each inverted line of video signal. At the end of a field, the program decoding starter 112 resets the counter 127, as shown in FIG. 7, the flip-flops in the master data control unit 68, and flip-flop 128 and the sequence is repeated for the next field. The following field produces a binary signal which is processed by the data processor 124 and serial-to-parallel converter 125. The resulting parallel decoded word, corresponds to the number set in the counter 127 as the divisor in the transmitter unit, is latched in latch 126 and presented as a divisor in counter 127 of the receiver unit. The counter 127 then counts as in the previous field until a desired count is obtained indicating the beginning of the scrambling sequence.

Thus there has been described with respect to a transmitter and receiving unit in accordance with the invention an apparatus for not only shifting the DC level of the vertical sync pulse, but further scrambling the video signal by alternating lines of a given sequence of lines in a video field so that alternate lines have an incorrect brightness level. The beginning point of the sequence is conveniently changed by either a random signal generator or a computer known to those skilled in the art.

Various modifications will occur to the skilled reader. For example, the complementary operation of a pair of gates can be achieved by connecting them to respective outputs of a flip-flop, rather than connecting one directly to an actuating signal and the other through an inverter to the actuating signal as described above.

What is claimed is:

1. An apparatus for scrambling a video signal, said video signal representing a plurality of sequential lines in a plurality of fields separated by vertical synchronization pulses comprising:
   means for generating a binary code identifying a starting line in each field of said video signal, said starting line separating an unscrambled portion from a scrambled portion, subsequent fields of said video signal having a different starting line;
   means for changing the luminance level and chrominance of alternate lines of a video signal following said starting line whereby a scrambled signal is produced, and a portion of said field contains alternate scrambled lines separated by unscambled lines; and subsequent fields have a different number of alternate scrambled lines separated by unscrambled lines.

2. An apparatus for scrambling a video signal of the type representing a plurality of horizontal lines of a picture field for display on a television receiver comprising:
   a source of video signals;
   a random number generator means for providing a starting signal during each field of said video signal, said starting signal occurring at a substantially random interval for identifying the beginning line of a scrambled portion of said field;
   means for changing the luminance level and chrominance of the video signal representing a plurality of alternate lines of the lines occurring subsequent to said starting signal, whereby a video signal is produced having an unscrambled portion and a scrambled portion which randomly varies between fields, said scrambled portion comprising scrambled lines separated by unscrambled lines, and subsequent fields having a different number of alternate scrambled lines separated by unscrambled lines.

3. The apparatus of claim 1, further comprising means for shifting the level of a vertical synchronization pulse associated with at least one of said fields.

4. The apparatus of claim 2, further comprising means for shifting the level of a synchronization pulse associated with a picture field.

5. A receiving apparatus for descrambling a television signal comprising:
   means for supplying a video signal representing a plurality of lines of a field, a first portion of said field being scrambled by inverting the brightness level of alternate lines in said portion, said alternate lines being separated by unscrambled lines, and a remaining portion which is unscrambled, subsequent fields of said video signal having a different number of alternate scrambled lines separated by unscrambled lines;
   means for supplying a signal identifying the first line of said plurality of lines in said scrambled portion; and
   means for inverting the brightness level of every other line subsequent to said first line represented by said video signal for the remaining portion of said scrambled portion in response to said signal identifying said first line.

6. A receiving apparatus for descrambling a television signal comprising:
   means for supplying a video signal representing a plurality of lines in a field, said plurality of lines comprising a first unscrambled portion, and a second scrambled portion which have the voltage level representing the luminance level and chrominance of alternate lines shifted, said alternate lines separated by lines which do not have the voltage representing the luminance level and chrominance shifted, subsequent fields of said video signal having a different number of alternate scrambled lines separated by unscrambled lines;
   means for shifting said voltage representing said luminance and chrominance of said alternate lines for restoring the luminance level and chrominance of said lines.

7. The apparatus of claim 6, further comprising means for altering the level of a synchronization pulse associated with a field of said video signal.

8. A method for scrambling a video signal, said video signal representing the luminance level and chrominance of a plurality of lines comprising a plurality of fields separated by vertical synchronization pulses comprising:
   shifting the level of at least one of said vertical synchronization pulses; and
   changing the luminance level and chrominance of portions of said video signal representing alternate lines of a portion of said fields whereby the luminance level and chrominance of said alternate lines is changed, said alternate lines being separated by unshifted lines, the number of said alternate lines separated by unshifted lines changing in successive fields.

9. The method of claim 8, wherein the portion of said field which contains said alternate lines varies between fields.

10. The method of claim 9, wherein the line at which said portion begins varies between fields.

11. The method of claim 9, wherein the portion of said field which contains said alternate lines varies randomly between fields.

12. The method of claim 10, wherein the line at which said portion begins varies between fields.

13. A receiving apparatus for descrambling a video signal comprising:
 means for supplying a video signal, said video signal representing the brightness level of a plurality of lines comprising a plurality of fields separated by vertical synchronization pulses, each of said fields having an unscrambled portion and a scrambled portion comprising a number of alternate lines which have a level shifted a predetermined amount thereby distorting the luminance level and chrominance associated therewith, each of said alternate lines separated by an unshifted line having a correct brightness level and chrominance, subsequent fields of said video signal having a different number of alternate scrambled lines separated by unscrambled lines;
 means for supplying an identifying signal for identifying the portion of each field which contains said scrambled alternate lines; and
 means for shifting the luminance level and chrominance of said video signal representing said alternate lines without shifting the remaining lines in response to said identifying signal, thereby restoring the brightness level of said alternate lines contained in said scrambled portion.

14. A receiving apparatus for descrambling a video signal comprising:
 means for supplying a video signal representing the luminance level and chrominance of a plurality of lines comprising a plurality of fields separated by vertical synchronization pulses, at least one of said vertical synchronization pulses having a level different from preceding synchronization pulses, each of said fields having a portion containing alternate lines which have a brightness level shifted in level a predetermined amount thereby distorting the brightness level associated therewith, said alternate lines being separated by lines having a correct brightness level, the number of alternate lines having a shifted brightness level separated by lines having a correct brightness level changing in successive fields;
 means for shifting the level of said one vertical synchronization pulse to correspond to the level of the remainder of said vertical synchronization pulses;
 means for supplying an identifying signal for identifying the portion of each field which contains said alternate lines; and
 means for shifting the luminance level of said video signal representing said alternate lines in response to said identifying signal, thereby restoring the luminance level of said alternate lines.

15. A method for scrambling a video signal comprising:
 generating during each vertical interval a random number identifying a horizontal line of a subsequent field of said video signal;
 counting subsequent horizontal lines following said identified line; and
 inverting alternate of said counted lines following said identified horizontal line, whereby a portion of said subsequent field contains an unscrambled portion and a remaining scrambled portion of alternate inverted lines, and the number of alternate scrambled lines in subsequent fields separated by unscrambled lines changes.

16. The method of claim 15, further comprising: inserting a signal representing said random number in said vertical interval, whereby decoding information for said subsequent field is provided with said video signal.

17. A method for unscrambling a video signal, each field of said video signal including a scrambled portion and unscrambled portion, the number of alternate scrambled lines separated by unscrambled lines changing in subsequent fields, said video signal including prior to each field a decoding signal, comprising:
 removing said decoding signal from said video signal;
 counting each line of said field until a line identified by said decoding signal is received; and
 inverting alternate lines of said video signal subsequent to said identified line, whereby said scrambled portion is unscrambled.

18. An apparatus for scrambling a video signal comprising:
 a random number generator for producing a random number during a vertical interval of each field;
 a preselectable line counter for counting horizontal lines of said video signal, said line counter being preset during each vertical interval with said random number, whereby an output signal is produced when a number of lines are counted corresponding to said random number;
 a binary counter for counting two horizontal lines, said counter being enabled by said presettable line counter whereby alternate lines provide an output signal; and
 means for inverting the luminance portion of said alternate lines in response to said binary counter output signal whereby a scrambled portion of each field is produced having alternate inverted lines and subsequent fields having a different number of alternate scrambled lines separated by unscrambled lines.

19. An apparatus for descrambling a video signal, said video signal containing a binary descrambling code during each vertical interval, said binary code identifying a starting line of an alternate line scrambling sequence, subsequent fields of said video signals having a different number of alternate scrambled lines separated by unscrambled lines, comprising:
 signal processing means for removing said descrambling code from said video signal;
 a presettable counter for receiving said descrambling code as a divisor, and counter being connected to count individual video lines subsequent to said vertical interval;
 a binary counter connected to count said video lines, said binary counter being enabled by said presettable counter after counting to a number corresponding to said divisor; and
 a line inversion means connected to receive said video signal, said inversion means being enabled by said binary counter whereby alternate lines of said video signal subsequent to a line identified by said descrambling code are inverted.

* * * * *